March 18, 1952     L. D. THOSTENSON     2,589,644

BUMPER STRUCTURE

Original Filed Sept. 9, 1946     2 SHEETS—SHEET 1

INVENTOR:
LEWIS D. THOSTENSON
BY HIS ATTORNEYS
HARRIS, KIECH, FOSTER & HARRIS

March 18, 1952 L. D. THOSTENSON 2,589,644
BUMPER STRUCTURE
Original Filed Sept. 9, 1946 2 SHEETS—SHEET 2

INVENTOR:
LEWIS D. THOSTENSON
BY HIS ATTORNEYS
HARRIS, KIECH, FOSTER & HARRIS

Patented Mar. 18, 1952

2,589,644

UNITED STATES PATENT OFFICE 2,589,644

BUMPER STRUCTURE

Lewis D. Thostenson, Inglewood, Calif., assignor to Salsbury Corporation, a corporation of California Original application September 9, 1946, Serial No. 695,592. Divided and this application April 28, 1947, Serial No. 744,278

2 Claims. (Cl. 293—61)

This invention relates to motor vehicles and has a special utility when applied to a motor driven bicycle or tricycle. The present application is a division of an application for Front End of a Motor Vehicle, Serial No. 695,592, filed September 9, 1946, now abandoned, of which I am co-applicant.

The vehicle hereinafter described may be called a motor driven bicycle, since it has two wheels, the rear wheel being driven by a motor and the front wheel being turned by handle bars to steer the vehicle. The wheels are smaller, however, than those ordinarily used on bicycles and are placed farther apart so that the rider may sit on a flat seat with his legs together and his feet resting on a flat surface.

The invention has for its objective the provision of a novel form of bumper structure particuarly adapted for motor vehicles of the type referred to above.

The advantages obtained by the use of this novel structure will be made evident hereinafter.

Figure 1:
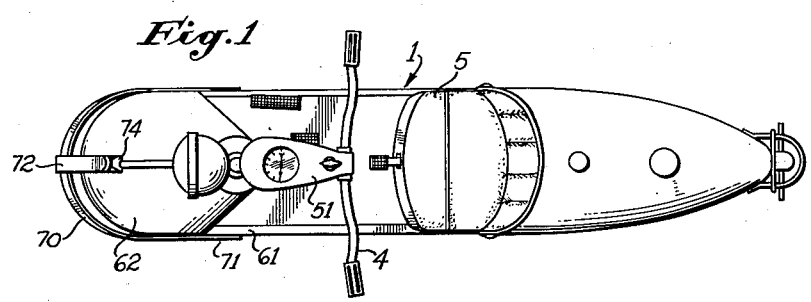
Fig. 1 is a view as seen from above of a vehicle in which the invention is embodied.
Figure 2:
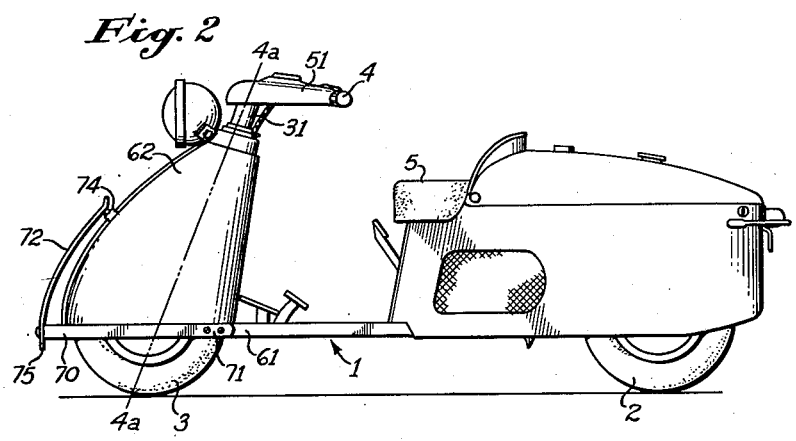
Fig. 2 is a side view of this vehicle.
Figure 3:
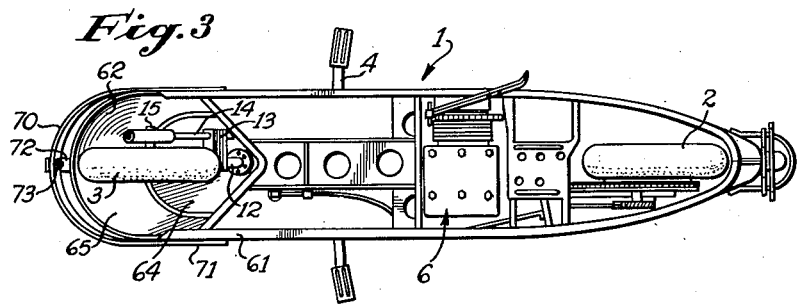
Fig. 3 is a view of this vehicle as seen from below the vehicle.

The present invention is best illustrated by disclosing its application to a motor driven bicycle, which is illustrated in the drawings, Figs. 1, 2, and 3 showing the complete vehicle. This vehicle consists of a body 1 supported on a rear wheel 2 and a front wheel 3, the vehicle being steered by handle bars 4 which turn about a steering axis indicated by the line 4a—4a in various figures. The driver sits upon a seat 5 with his feet on a flat support forming part of the body 1. The rear wheel 2 is driven by an engine 6 situated below and a little behind the seat 5. The engine is controlled by the driver by means forming no part of the invention claimed herein and therefore not described.

Figures 4, 5:
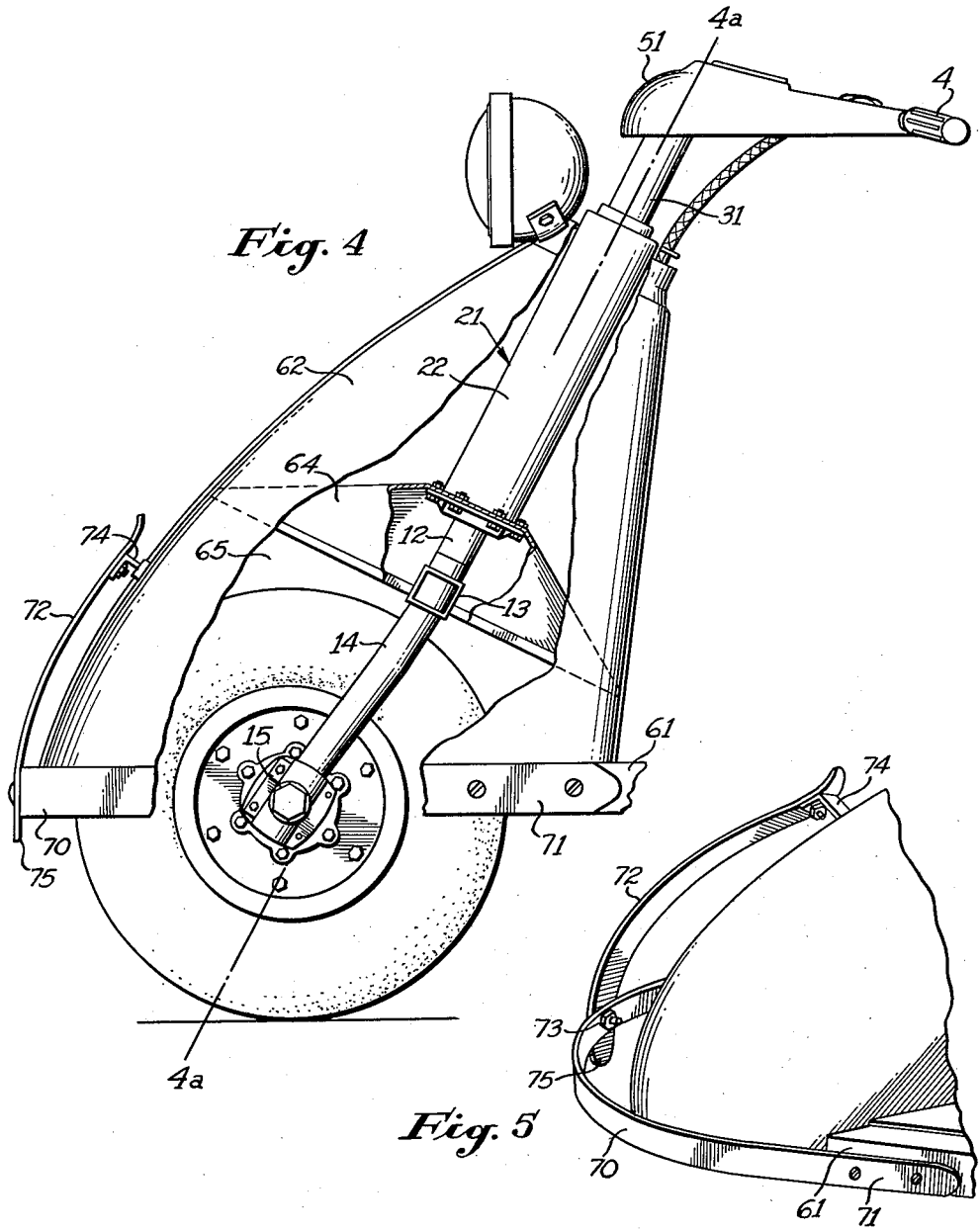
Fig. 4 is a side view of the vehicle shown in the preceding views, the front portion thereof being broken away to show the internal construction.
Fig. 5 is a perspective view of the bumper used on the front end of the vehicle.

In the present improved motor vehicle, the front wheel 3 is rotatable on a wheel shaft or axle 15 which is carried at the lower end of a strut 14 which, in turn, is connected by an arm 13 to a steering shaft 12 (Figs. 3 and 4). The shaft 12 is splined at its upper end to a steering tube 31 and the shaft and tube are adapted to turn as a unit in ball bearings (not shown) held in a bearing housing assembly 21 which includes an outer cylindrical shell 22. Adjustably secured to the upper end of the steering tube 31 is a member 51 which carried the handle bars 4. The bearing assembly 21 is supported from the frame 61 of the vehicle by means of an outer conoidal member 62, the upper apex of which is secured to the upper end of the shell 22. The rim of the lower base end of the outer conoidal member 62 is suitably secured to the forward ends of side members of the vehicle frame 61 as shown in Figs. 3 and 5. An inner conoidal member 64 has its upper apex secured to the lower end of the shell 22 and its lower base end secured to the inside of the outer conoidal member 62 to complete the supporting structure. The inner and outer conoidal members 64 and 62 define a wheel cavity 65 in which the front wheel 3 is adapted to turn to steer the vehicle when the handle bars 4 are turned.

A novel form of bumper, best shown in Fig. 5, is used in this vehicle, consisting of a curved, flexible horizontal bumper 70 secured at its rear end 71 to the side members of the frame 61 and extending around the front of the vehicle, a small space being left between the conoidal member 62 of the vehicle and the inner side of the horizontal bumper 70 so as to allow the bumper to yield under pressure. A vertical bumper 72, also formed of flat, flexible, sheet steel, is bolted as shown at 73 to the center of the horizontal bumper 70, the upper end of the vertical bumper 72 being rigidly secured to the outer cone 62 by means of a bracket 74. The lower end 75 of the vertical bumper 72 projects below the horizontal bumper 70, as shown in Fig. 5. The bumpers 70 and 72 provide protection against impact for the front end of the vehicle.

It will be observed from the foregoing that the bumper structure provides adequate protection for the front end of the motor vehicle, it being noted that in previous vehicles of this general type, no such protection has been practical, and such vehicles are in especial need of this protection. It is within the concept of this invention to provide a plurality of either the horizontal or vertical bumpers, or both, to protect further the front end of the motor vehicle.

I claim as my invention:

1. In a vehicle having a frame, a single steerable wheel at its front end and a conoidal supporting housing having a lower open end secured to the frame, the upper portion of said wheel being entirely enclosed by said housing, a bumper structure for protecting said housing, comprising: an arcuate, flexible, horizontal bumper member having its ends secured to the sides of the frame, said member extending around the lower open end of the housing in spaced relation thereto; a bracket mounted on the housing at the front portion thereof and above said bumper member; and a flexible, vertical, bumper member having a lower end connected to the central portion of said horizontal bumper member and an upper end connected to said bracket.

2. In a vehicle having a frame, a single steerable wheel at its front end and a conoidal supporting housing having a lower open end secured to the frame, the upper portion of said wheel being entirely enclosed by said housing, a bumper structure for protecting said housing, comprising: an arcuate, flexible, horizontal bumper member having its ends secured to the sides of the frame, said member extending around the lower open end of the housing in spaced relation thereto; a bracket mounted on the housing at the front portion thereof and above said bumper member; and a curved, flexible, substantially vertical bumper member having a lower end connected to the central portion of said horizontal bumper member and an upper end connected to said bracket, said substantially vertical bumper member being of substantially the same curvature as the front portion of said conoidal housing and extending in spaced relation thereto.

LEWIS D. THOSTENSON.

REFERENCES CITED

The following references are of record in the file of this patent:

UNITED STATES PATENTS

| Number | Name | Date |
| --- | --- | --- |
| 998,788 | Matthews | July 25, 1911 |
| 1,546,948 | Sohl | July 21, 1925 |
| 1,706,162 | Howarth et al. | Mar. 19, 1929 |
| 2,194,660 | Huff | Mar. 26, 1940 |
| 2,197,532 | Spitz | Apr. 16, 1940 |
| 2,206,023 | Broadwell | July 2, 1940 |
| 2,246,616 | Cherry | June 24, 1941 |
| 2,253,041 | Morse | Aug. 19, 1941 |